(12) United States Patent
Ono et al.

(10) Patent No.: US 9,841,504 B2
(45) Date of Patent: Dec. 12, 2017

(54) PHOTOSENSOR UNIT WITH A CONDENSING LENS INCLUDING A PLURALITY OF LIGHT-EMITTING CONVEX LENS

(71) Applicants: Alpha Corporation, Yokohama-shi, Kanagawa (JP); Nissan Motor Co., LTD., Yokohama-shi, Kanagawa (JP)

(72) Inventors: Takashi Ono, Yokohama (JP); Wataru Hirai, Atsugi (JP)

(73) Assignees: ALPHA CORPORATION, Kanagawa (JP); NISSAN MOTOR CO., LTD., Kanagawa (JP)

( * ) Notice: Subject to any disclaimer, the term of this patent is extended or adjusted under 35 U.S.C. 154(b) by 219 days.

(21) Appl. No.: 14/435,213

(22) PCT Filed: Dec. 11, 2013

(86) PCT No.: PCT/JP2013/083180
§ 371 (c)(1),
(2) Date: Apr. 13, 2015

(87) PCT Pub. No.: WO2014/097941
PCT Pub. Date: Jun. 26, 2014

(65) Prior Publication Data
US 2015/0285910 A1    Oct. 8, 2015

(30) Foreign Application Priority Data

Dec. 20, 2012   (JP) .................... 2012-277829

(51) Int. Cl.
*G01S 17/02* (2006.01)
*G01J 1/02* (2006.01)
(Continued)

(52) U.S. Cl.
CPC .......... *G01S 17/026* (2013.01); *G01J 1/0214* (2013.01); *G01J 1/0271* (2013.01); *G01J 1/0411* (2013.01);
(Continued)

(58) Field of Classification Search
CPC ........ E05F 15/40; G01J 1/0214; G01J 1/0271; G01J 1/0411; G01S 17/026; G01S 7/4813; G01S 7/4815
See application file for complete search history.

(56) References Cited

U.S. PATENT DOCUMENTS 5,955,854 A     9/1999   Zhang et al.
7,309,855 B2 *  12/2007  Nagasaka ............... G01D 5/305
                                                    250/231.14
(Continued)

FOREIGN PATENT DOCUMENTS

JP      63-193102 A    8/1988
JP      10-239451 A    9/1998
(Continued)

OTHER PUBLICATIONS

Official Communication issued in corresponding European Patent Application No. 13866109.5, dated Jul. 27, 2015.
(Continued)

Primary Examiner — Francis M Legasse, Jr.
(74) Attorney, Agent, or Firm — Keating and Bennett, LLP

(57) ABSTRACT

An object of the present invention is to provide a photosensor unit with a structure which is simple and also does not cause decrease in detection accuracy. Provided is a photosensor unit including a light emitting element 1 and a light receiving element 2 housed in a unit case 3, and configured such that reflected light of detection light emitted from the light emitting element 1 to the outside of the unit case 3 is received with the light receiving element 2, the reflected light being reflected from the outside of the unit case 3. A plurality of the light emitting elements 1 are disposed around the light receiving element 2, and a passage space for the reflected light inside the unit case 3 is separated from a passage space for the detection light inside the unit case 3 by an appropriate partition 4.

3 Claims, 9 Drawing Sheets

(51) Int. Cl.
　　　G01J 1/04　　　　(2006.01)
　　　G01S 7/481　　　(2006.01)
　　　E05F 15/40　　　(2015.01)
(52) U.S. Cl.
　　　CPC .......... *G01S 7/4813* (2013.01); *G01S 7/4815* (2013.01); *E05F 15/40* (2015.01)

(56) References Cited

U.S. PATENT DOCUMENTS

| | | |
|---|---|---|
| 2004/0031908 A1 | 2/2004 | Neveux et al. |
| 2008/0302951 A1 | 12/2008 | Aoki et al. |
| 2009/0097268 A1* | 4/2009 | Mochizuki ........... F21S 48/1159 362/538 |
| 2013/0169408 A1 | 7/2013 | Endo |

FOREIGN PATENT DOCUMENTS

| | | |
|---|---|---|
| JP | 2002-214361 A | 7/2002 |
| JP | 2004-502062 A | 1/2004 |
| JP | 2009-020763 A | 1/2009 |
| JP | 2009-150690 A | 7/2009 |
| JP | 2011-237315 A | 11/2011 |
| WO | 2007/099611 A1 | 9/2007 |
| WO | 2012/043663 A1 | 4/2012 |
| WO | 2012/108440 A1 | 8/2012 |

OTHER PUBLICATIONS

Official Communication issued in International Patent Application No. PCT/JP2013/083180, dated Feb. 10, 2014.

\* cited by examiner (a)

(b)

(c)

(a)

(b)

(a)

(b)

(a)

(b)

(c)

PHOTOSENSOR UNIT WITH A CONDENSING LENS INCLUDING A PLURALITY OF LIGHT-EMITTING CONVEX LENS

TECHNICAL FIELD

The present invention relates to a photosensor unit.

BACKGROUND ART

A photosensor unit described in Patent Document 1 has been known as a photosensor unit including a light emitting element and a light receiving element housed in a unit case. In this conventional example, one light receiving element and one light emitting element are disposed side by side in the unit case.

PRIOR ART DOCUMENT

Patent Document

Patent Document 1: Japanese Patent Application Publication No. 2009-150690

SUMMARY OF THE INVENTION

Problems to be Solved by the Invention

However, in the conventional example mentioned above, the amount of irradiation light from the single light emitting element is limited. Thus, when the area where the detection takes place is outdoor, e.g. outside a vehicle, the amount of reflected light from a detection object is reduced. This leads to a problem of lowered detection accuracy.

Using a plurality of light emitting elements is considered effective to solve this problem. In this case, however, in order to effectively condense the detection light from each light emitting element in a detection region and also condense the reflected light in a light receiving region, there is a problem in that the optical system needs to be designed for each light emitting element's arrangement and also the structure becomes complicated.

The present invention has been made in view of solving the above disadvantages, and an object thereof is to provide a photosensor unit capable of increasing the amount of detection light to a detection region with a simple structure.

Moreover, another object of the present invention is to provide a door controlling device of a vehicle using the above photosensor unit.

Means for Solving the Problems

According to the present invention, the above objects are achieved by providing a photosensor unit including a light emitting element 1 and a light receiving element 2 housed in a unit case 3, and configured such that reflected light of detection light emitted from the light emitting element 1 to an outside of the unit case 3 is received with the light receiving element 2, the reflected light being reflected from the outside of the unit case 3, wherein a plurality of the light emitting elements 1 are disposed around the light receiving element 2, a passage space for the reflected light inside the unit case 3 is separated from a passage space for the detection light inside the unit case 3 by an appropriate partition 4, and the unit case 3 is provided with a condensing lens 5 configured to condense irradiation light from each of the light-emitting elements 1 at a single focal point on an optical path of the reflected light.

The photosensor unit is designed as a unit including the light receiving element 2 and the light emitting elements 1 housed in the unit case 3, and is configured to emit irradiation light (detection light) from the light emitting elements 1 to the outside of the unit case 3 and receive reflected light from the outside of the unit case 3 with the light receiving element 2 to thereby detect the presence of a detection object.

By housing the plurality of light emitting elements 1 inside the unit case 3, the amount of the detection light to be delivered to the outside of the unit case 3 can be increased. Moreover, by separating the passage space for the reflected light from the passage space for the irradiation light, the irradiation light from the light emitting elements 1 is prevented from being inputted directly to the light receiving element 2. Accordingly, the detection accuracy can be enhanced.

Moreover, since the light emitting elements 1 are disposed around the light receiving element 2, the passage space for the reflected light can be easily separated from the passage space for the detection light by simply standing a tubular partition 4 around the light receiving element 2.

Further, by disposing the plurality of light emitting elements 1 around the light receiving element 2, the detection light can be condensed on the optical path of the reflected light without having to use a complicated optical system. Thus, the structure can be simplified and the manufacturing cost can be lowered as well.

Moreover, in the case of making a photosensor unit in which the light emitting elements 1 are disposed at an equal interval on a single circle centered at the light receiving element 2, a region around the optical path of the reflected light, i.e. the detection region can be irradiated evenly with the detection light. Thus, it is possible to reduce variations in detection accuracy within the detection region.

Further, the condensing lens 5 configured to condense the irradiation light from each light emitting element 1 may include a plurality of light-emitting convex lens portions 6 integrally formed therewith respectively for the light emitting elements 1. In this way, the assemblability is improved, and also individual adjustment of lens positions and the like are not necessary, which makes it possible to reduce quality variations.

Furthermore, the above photosensor unit can be used in a door controlling device of a vehicle 7, including:

the photosensor unit according to any one of claims 1 to 4 attached to the vehicle 7; and a door controlling unit 8 configured to start a preparatory operation for moving a door of the vehicle 7 when a detection object is detected based on a level of light reception at the light receiving element 2.

EFFECT OF THE INVENTION

According to the present invention, it is possible to increase the amount of the detection light to the detection region with a simple structure.

MODE FOR CARRYING OUT THE INVENTION

Figure 1:
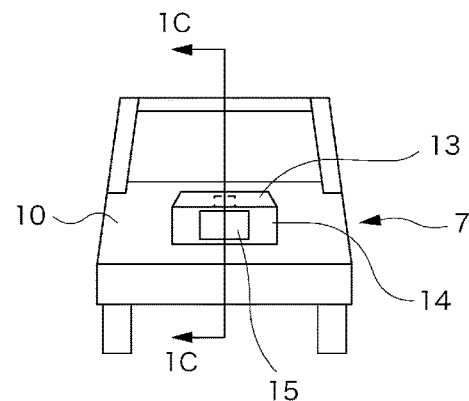
FIG. 1 shows a vehicle in which a door controlling device is used, and part (a) is a view of the vehicle as seen from the rear, part (b) is a side view of the vehicle, and part (c) is a cross sectional view taken along line 1C-1C in part (a).
Figure 1:
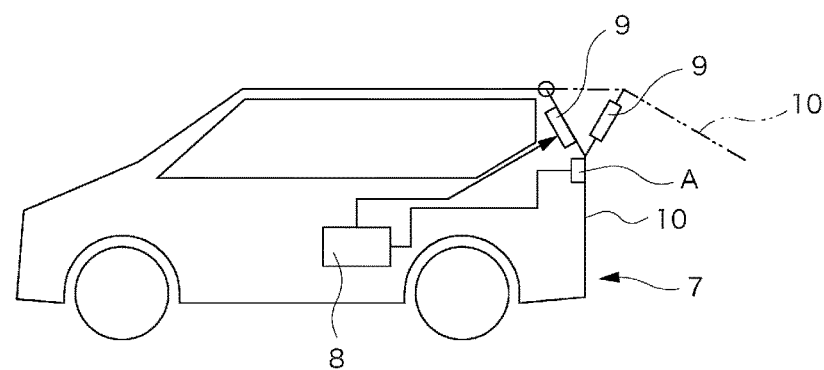
Figure 1:
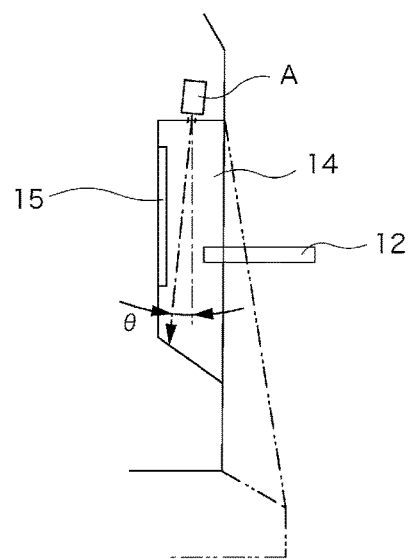

FIG. 1 shows a vehicle 7 in which a door controlling device is used. In this example, the door controlling device is configured as a back-door controlling device for controlling opening-closing operations of a power back door which is driven by a driving device 9 such as a damper device. The door controlling device includes a photosensor unit (A) fixed to a back door 10 of the vehicle 7, and a door controlling unit 8 for controlling the driving device 9.

As will be described later, the photosensor unit (A) is configured to output a detection signal when detecting that a detection object 12 enters a predetermined detection region 11 into which detection light is emitted. The photosensor unit (A) is fixed to an upper wall portion of a license-plate attaching recess 14 covered by a license-plate finisher 13. Note that reference numeral 15 in FIG. 1 denotes a license plate.

Moreover, in this example, the optical axis of the detection light is inclined slightly toward to the inside of the vehicle 7 (by an angle θ) so that the detection region 11 of the photosensor unit (A) can be situated inside the license-plate attaching recess 14. In this way, it is possible to prevent unnecessary reaction of the photosensor unit (A) by a person, animal, trash or the like other than the user of the vehicle 7 present near the vehicle 7, which would otherwise occur due to decrease in detection performance outside the license-plate attaching recess 14.

In this example, when the photosensor unit (A) outputs a detection signal, the door controlling unit 8 first performs preparatory operations such as authentication of an electronic key the user has, detection of the state of the back door, and a locking-unlocking operation, and then drives the driving device 9. The authentication of the electronic key is performed by authenticating an authentication code outputted by the electronic key through communication with an authentication device not shown. If the authentication is successful, the back door 10 is unlocked on condition that the back door 10 is closed, and the driving device 9 is then driven to start a door opening operation.

Thus, in this embodiment, even when the user's hands are full with luggage or the like, the user can open the back door 10 only by moving the luggage or the like 12 to the inside of the license-plate attaching recess 14 or the vicinity thereof which are set as the detection region 11. Accordingly, the convenience is improved.

Figure 2:
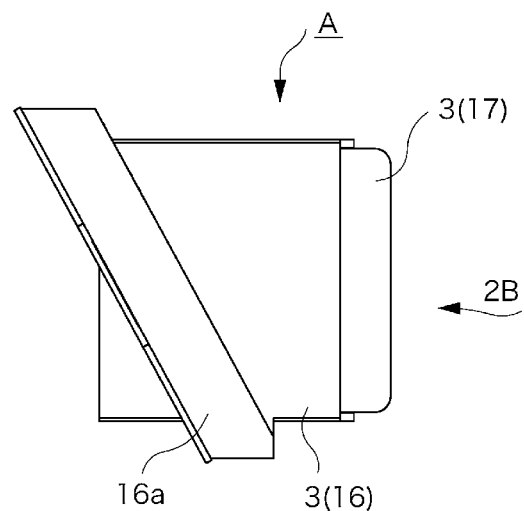
FIG. 2 is a set of views showing a photosensor unit, and part (a) is a side view, and part (b) is a view as seen in the direction of arrow 2B in part (a).
Figure 2:
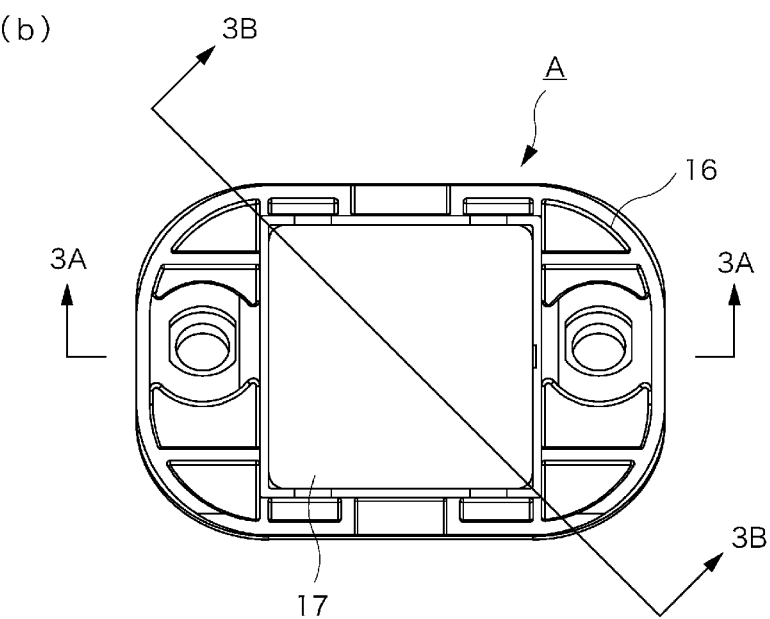

FIG. 2 and the subsequent drawings show the photosensor unit (A). The photosensor unit (A) includes, as its constituent components, a unit case 3 fixed to the vehicle 7, and light emitting elements 1 and a light receiving element 2 housed in the unit case 3.

The unit case 3 includes a bracket 16 with a fixing flange 16a to be fixed to the vehicle 7 provided in a protruding manner, and an inner case 17 to be fixed to the bracket 16. With a transparent synthetic resin material, the inner case 17 is formed in a tubular shape with one end closed, and is attached to the bracket 16 by inserting its open end into a front end opening of the bracket 16.

Figure 4:
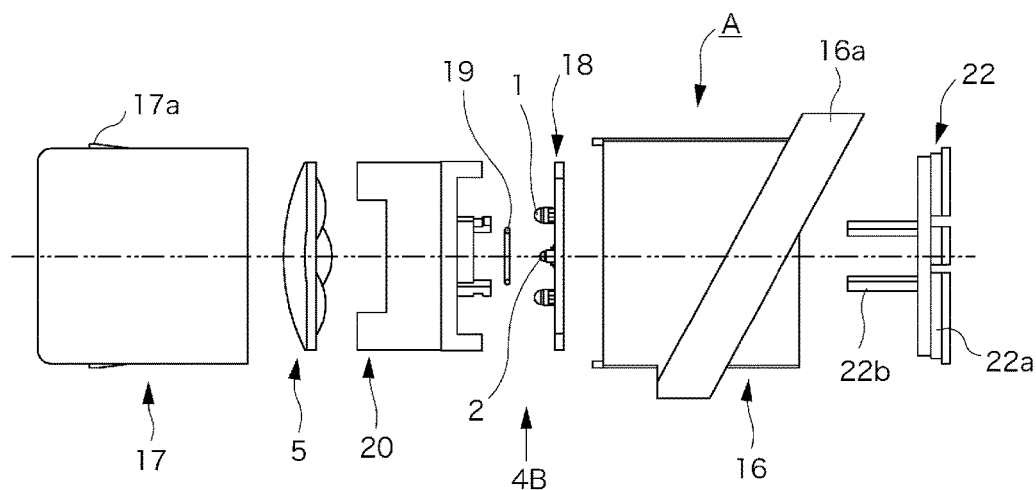
FIG. 4 is a set of exploded views of the photosensor unit, and part (a) is a side view, and part (b) is a view as seen in the direction of arrow 4B in part (a).
Figure 4:
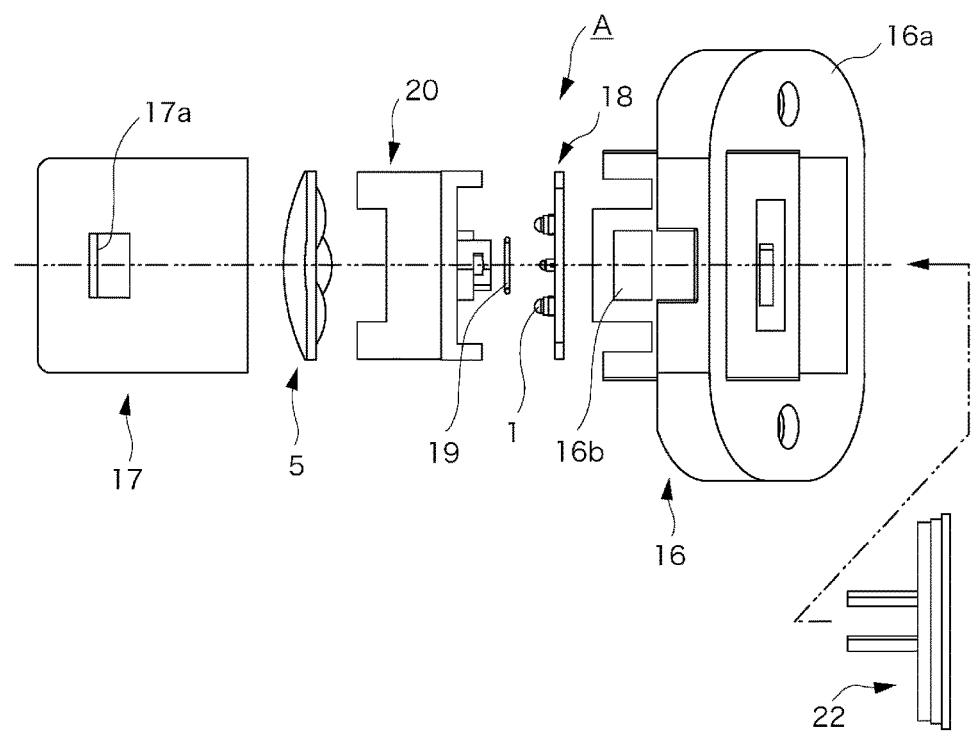

The inner case 17 is provided with hook-shaped protrusions 17a on its sidewalls while the bracket 16 is provided with locking openings 16b configured to lock the protrusions 17a so that the inner case 17 can be held inside the bracket 16 (see FIG. 4).

Infrared LEDs configured to emit invisible light pulses such as infrared rays are used as the light emitting elements 1 while a photodiode is used as the light receiving element 2. These light emitting elements 1 and light receiving element 2 are mounted on the surface of the same mounting board 18.

Figure 5:
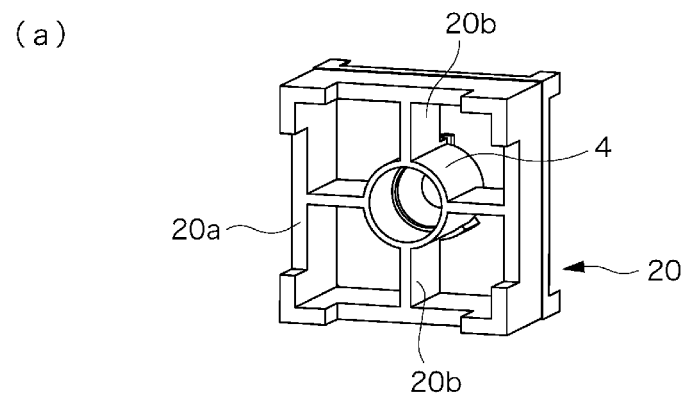
FIG. 5 is a set of views showing a partition member, and part (a) is a perspective view, part (b) is a view showing the relationship with a mounting board, and part (c) is a plan view showing a state where the mounting board is attached.
Figure 5:
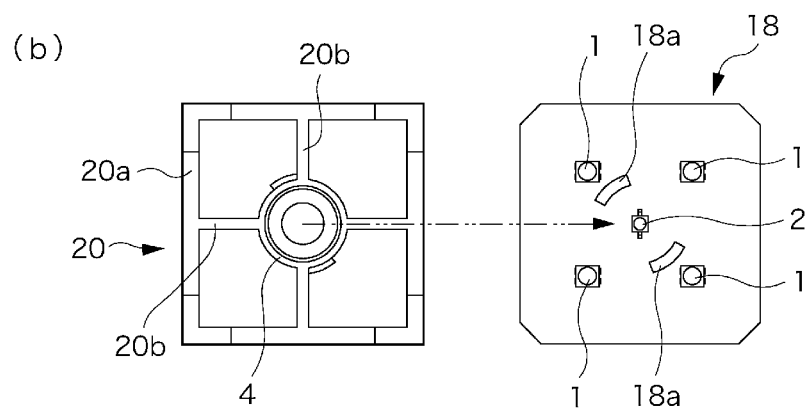
Figure 5:
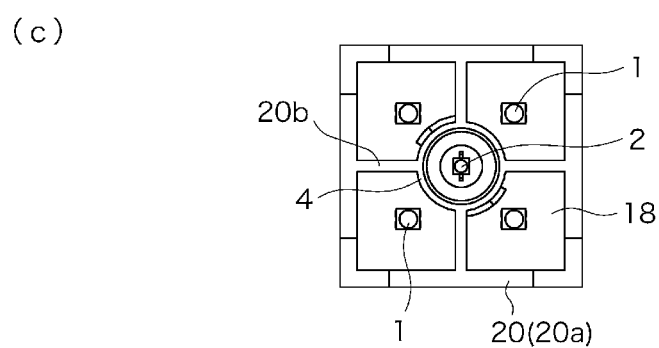

As shown in FIG. 5, the light emitting elements 1 and the light receiving element 2 are disposed such that the light receiving element 2 is disposed on a center portion of the mounting board 18 while the light emitting elements 1 are disposed at an equal interval on a single circle centered at the light receiving element 2.

Note that FIG. 5 shows a case where a single light receiving element 2 is mounted on the mounting board 18 but, in a case where a plurality of light receiving elements 2 are mounted, the light receiving elements 2 are disposed together inside a light receiving region surrounded by an O-ring 19 to be described later, while the light emitting elements 1 are disposed evenly on a single circle or concentric circles centered at the light receiving region.

A partition member 20 is attached inside the unit case 3 to prevent irradiation light (detection light) from the light emitting elements 1 from directly entering the light receiving element 2. As shown in part (a) of FIG. 5, the partition member 20 made of an opaque synthetic resin material includes: a rectangular frame portion 20a whose outer periphery substantially coincides with the outer periphery of the mounting board 18; a partition 4 disposed in the center of the rectangular frame portion 20a and formed in a tubular shape opened on the upper and lower sides; and separating walls 20b connecting the partitioning wall 4 to the rectangular frame portion 20a.

Figure 3:
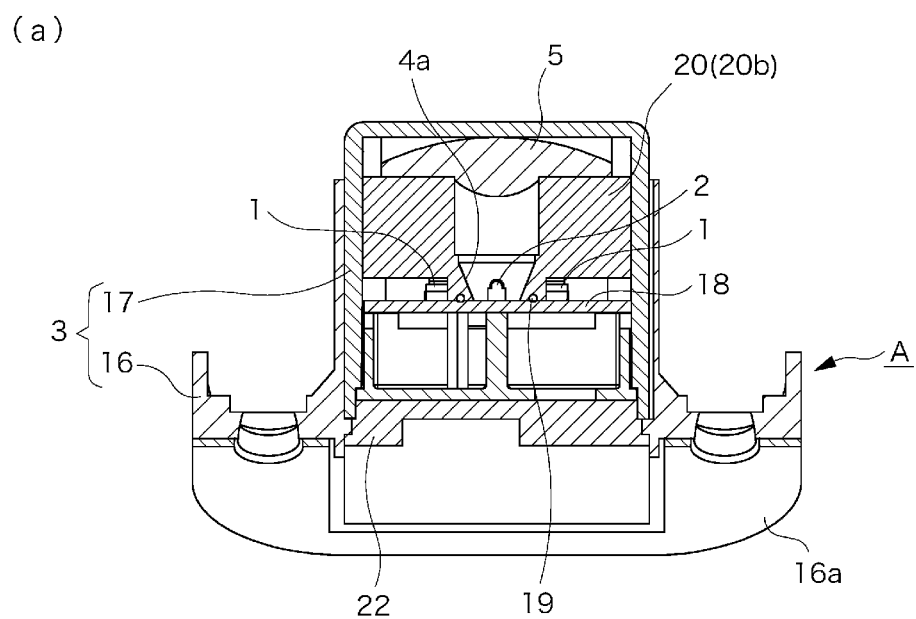
FIG. 3 is a set of cross-sectional views of the photosensor unit, and part (a) is a cross-sectional view taken along line 3A-3A in part (b) of FIG. 2, and part (b) is a cross-sectional view taken along line 3B-3B in part (b) of FIG. 2.
Figure 3:
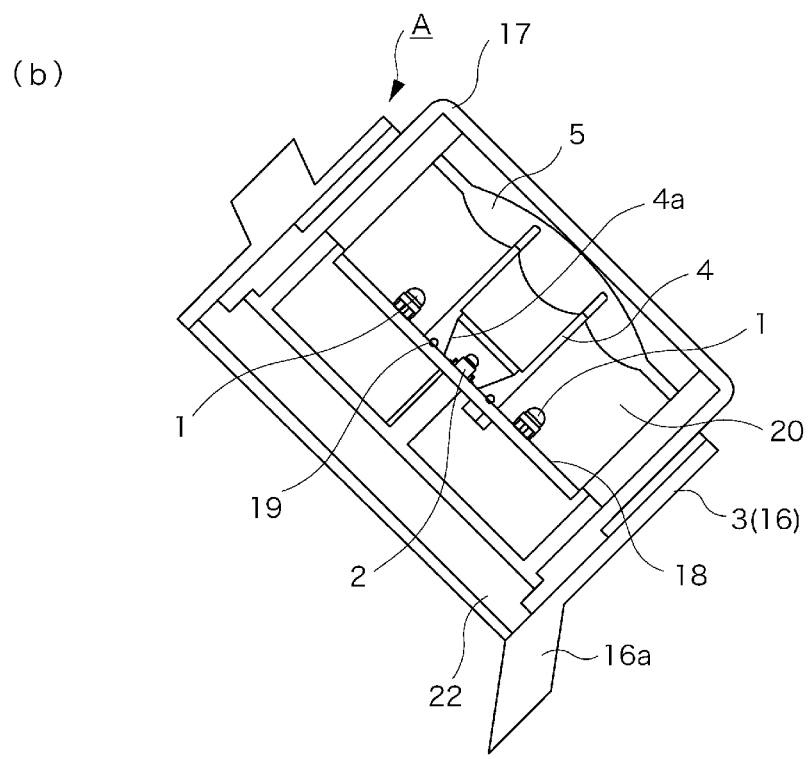

As shown in part (c) of FIG. 5, the mounting board 18 is attached to the partition member 20. In this state, a region around the light receiving element 2 is surrounded by the partition 4 and is therefore separated from the other space inside the unit case 3 as a passage space for reflected light from a detection object. As shown in FIG. 3, on the inner peripheral wall surface of the partition 4, a tapered portion 4a is formed which gradually becomes larger in diameter toward the upper side from the mounting board 18 on which the light receiving element 2 is mounted. In this way, the efficiency of condensation of the reflected light by the mirror effect on the inner wall of the partition 4 is improved.

On the other hand, the space inside the rectangular frame portion 20a in the unit case 3 is separated by the separating walls 20b and used as passage spaces for the detection light emitted from the light emitting elements 1. In this example, four passage spaces are formed for the detection light to match the number of the light emitting elements 1, and each light emitting element 1 is disposed in a center portion of its passage space.

Figure 6:
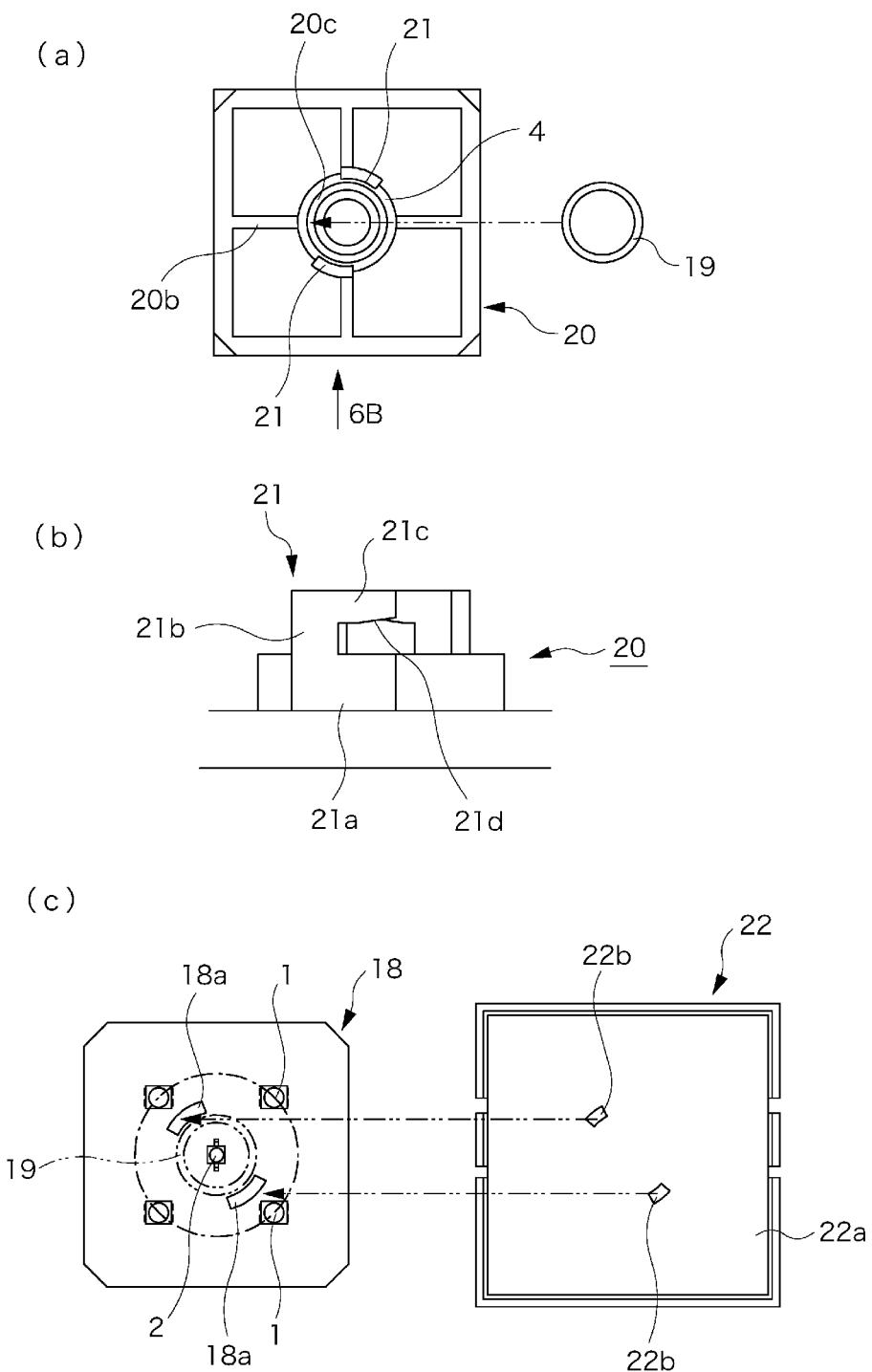
FIG. 6 is a set of views showing attachment of the partition member, and part (a) is a view showing how an O-ring is attached, part (b) is an enlarged view of a chief part of (a) as seen from a direction 6B, and part (c) is a view showing stoppers.

Further, as shown in FIG. 6, an O-ring attaching groove 20c is formed in the lower end surface of the partition member 20, and the O-ring 19 is fitted therein. In addition, two locking portions 21 are formed on a circle which is concentric with the O-ring attaching groove 20c and larger in diameter than the O-ring attaching groove 20c.

Each locking portion 21 has an arc shape in a back view as shown in part (a) of FIG. 6, and is formed in a hook shape as shown in part (b) of FIG. 6 by including a pillar portion 21b protruding from a base portion 21a in a direction away from the back surface, and a holding portion 21c extending in the circumferential direction from the pillar portion 21b. The distance between the proximal end of the holding portion 21c and the base portion 21a is made substantially equal to the thickness of the mounting board 18. In addition, the upper face of a distal end portion of the holding portion 21c is an inclined surface such that a cam portion 21c is formed. The distance between the cam portion 21d and the base portion 21a becomes gradually wider toward the distal end.

On the other hand, as shown in part (b) of FIG. 5, locking holes 18a are bored in a center portion of the mounting board 18. There are two locking holes 18a formed at point-symmetric positions as arc-shaped holes in which the holding portions 21c can be fitted.

Figure 7:
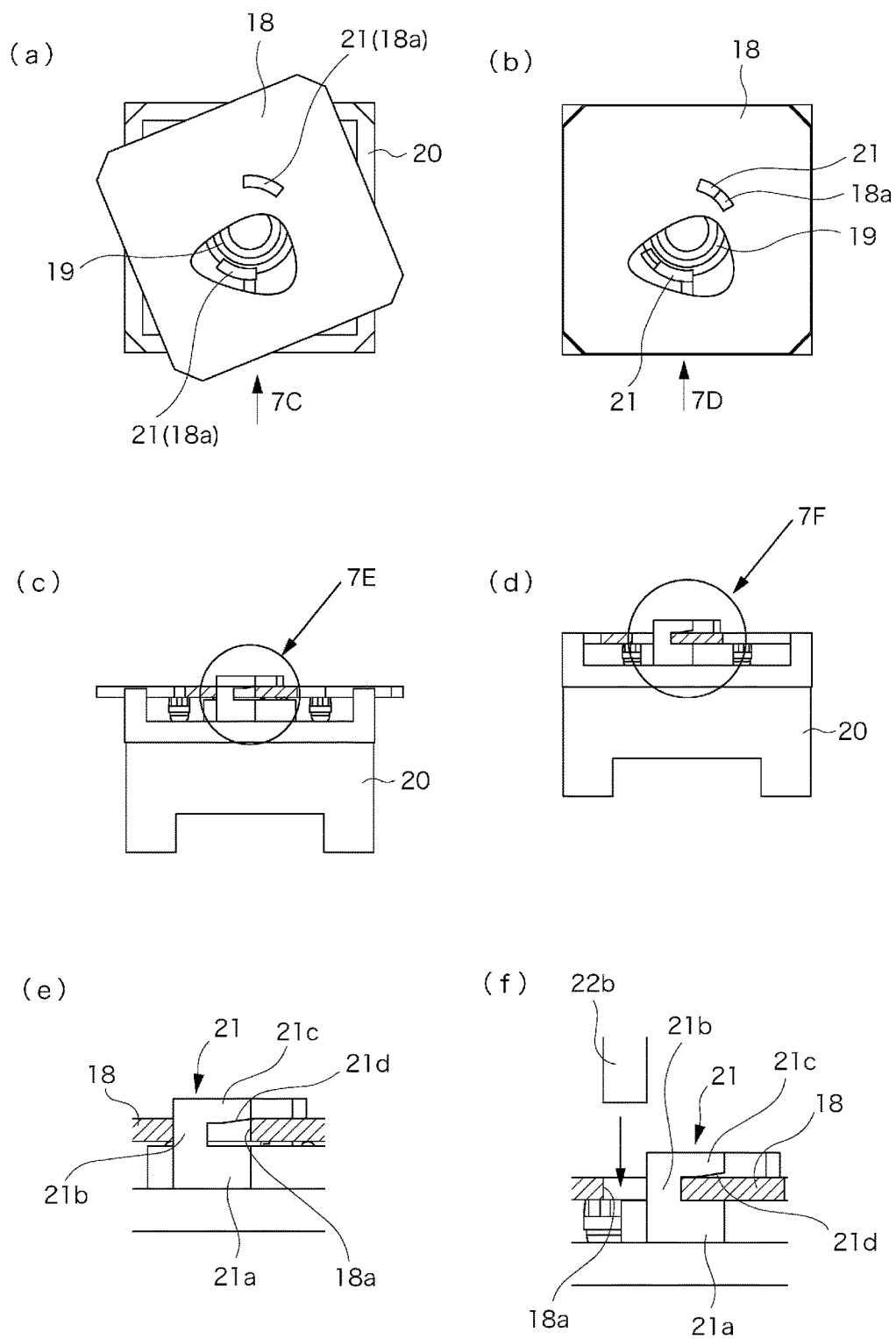
FIG. 7 is a set of views showing how a cam portion operates, and part (a) is a plan view showing a state where the mounting board is set on the partition member, part (b) is a plan view showing a state where the mounting board is turned, part (c) is a partial cross-sectional view of part (a) as seen from a direction 7C, part (d) is a partial cross-sectional view of part (b) as seen from a direction 7D, part (e) is an enlarged view of section 7E in part (c), and part (f) is an enlarged view of section 7F in part (d).

Thus, in this embodiment, the mounting board 18 and the partition member 20 are connected by firstly attaching the O-ring 19 to the partition member 20 as shown in part (a) of FIG. 6 and then fitting the locking portions 21 into the locking holes 18a as shown in part (a) of FIG. 7. In this fitted state, an end surface of each locking hole 18a of the mounting board 18 faces a position immediately above the free end of the corresponding holding portion 21c as shown in parts (c) and (e) of FIG. 7. From this state, the mounting board 18 is turned clockwise as shown in part (b) of FIG. 7. Thus, the mounting board 18 is pushed by the inclined surface of the cam portion 21d and guided to the base portion side of each locking portion 21.

As a result, the O-ring 19 is compressed by a predetermined amount of compression, so that the partition member 20 and the mounting board 18 come into tight contact with each other at their boundary portion with the O-ring 19 interposed therebetween. In this way, leakage of light through the boundary portion is prevented completely.

In this state, a region from the surface on which the light receiving element 2 is mounted to the front end of the partition member 20 is completely isolated from a region which is irradiated with the light emitted from the light emitting elements 1. In this way, the emitted light never directly enters the light receiving element 2. Thus, the detection accuracy is improved.

Further, a lid 22 is attached to the unit case 3. As shown in FIG. 6, the lid 22 is formed by standing stoppers 22b on a lid plate portion 22a attached to a bottom portion of the bracket 16. In a state where this lid 22 is connected to the unit case 3, the stoppers 22b are inserted in the clearances between the locking holes 18a and the holding portions 21c which appear by the turning of the mounting board 18 as shown in parts (b) and (f) of FIG. 7. In this way, the mounting board 18 and the partition member 20 are prevented from returning to the postures at the beginning of their attachment.

Figure 8:
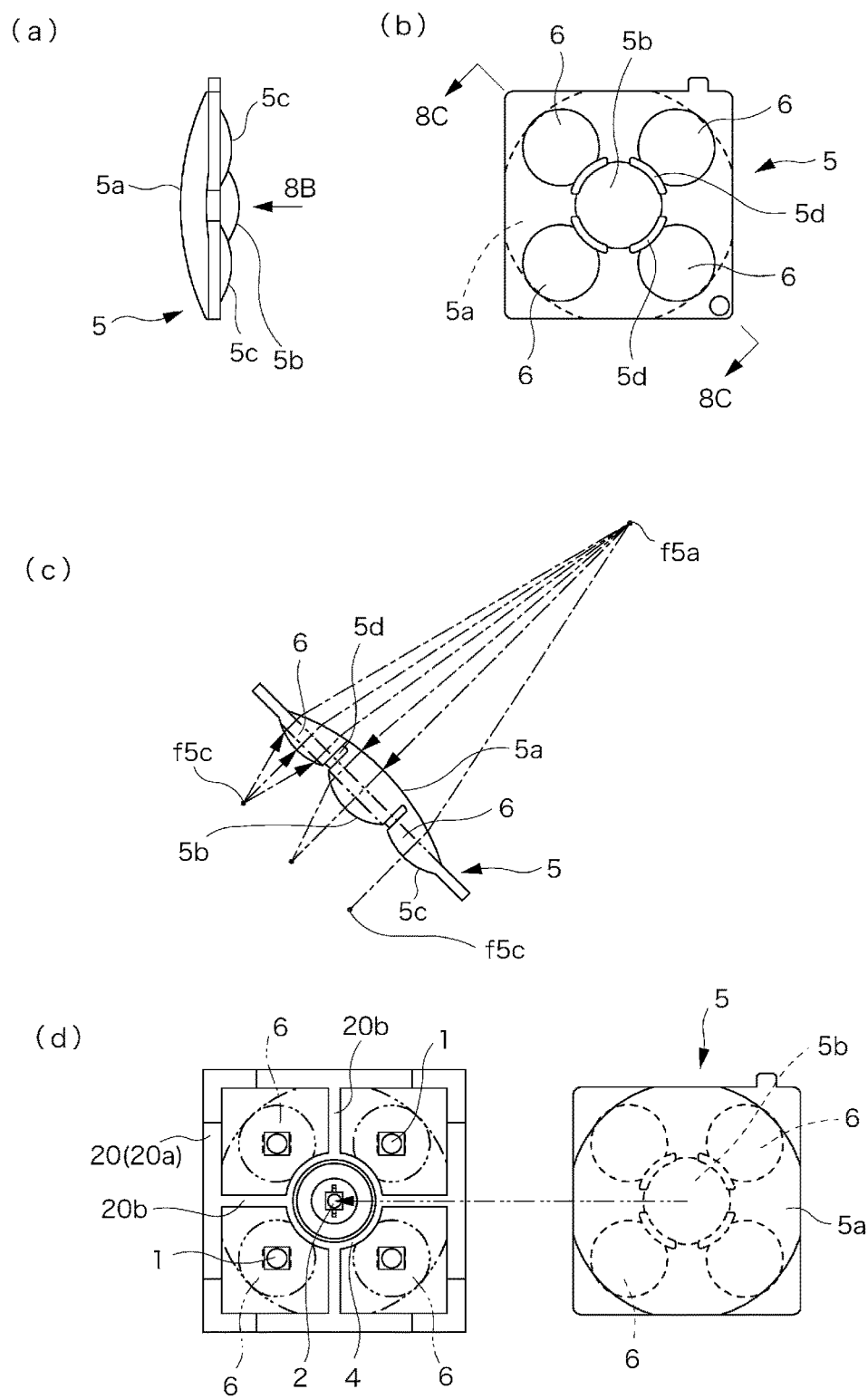
FIG. 8 is a set of views showing a lens, and part (a) is a side view, part (b) is a view as seen in the direction of arrow 8B in part (a), part (c) is a cross-sectional view taken along line 8C-8C in part (b), and part (d) is a view showing an attached state to the partition member.

Further, a condensing lens 5 is attached to an upper end portion of the partition member 20. As shown in FIG. 8, the condensing lens 5 is formed from an acrylic resin in a square shape in a plan view. It has a single convex lens surface 5a over substantially the entire surface on the upper side (object side) and has one light-receiving convex lens surface 5b and a plurality of light-emitting convex lens surfaces 5c on the opposite side (light-source side).

Each of the convex lens surfaces 5a, 5b, and 5c is formed by a spherical surface. The light-receiving convex lens surface 5b has a diameter substantially equal to the inner diameter of the partition 4 of the partition member 20 and is disposed at the center of the condensing lens 5. This light-receiving convex lens surface 5b and the single convex lens surface 5a are situated in such a way as to share a rotation axis about which their spherical surfaces are defined by rotation. These single convex lens surface 5a and light-receiving convex lens surface 5b are attached by being positioned such that the above-mentioned shared rotation axis which serves as an optical path in the case where the single convex lens surface 5a and the light-receiving convex lens surface 5b are each a plano-convex lens, coincides with the center axis of the partition 4 of the partition member 20.

In order to position the condensing lens 5, positioning pillars configured to be in contact with the four corners of the condensing lens 5 are provided on the upper end of the partition member 20.

On the other hand, each light-emitting convex lens surface 5c forms a light-emitting convex lens portion 6 in cooperation with a part of the single convex lens surface 5a. The light-emitting convex lens surface 5c is formed such that the optical axis thereof is in parallel with the optical axis of the light-receiving convex lens surface 5b and the diameter thereof is substantially equal to the length of one side of a section separated by the separating walls 20b of the partition member 20, and is disposed such that one light emitting element 1 is located on each optical axis. A groove 5d is formed at the boundary portion of the light-emitting convex lens surface 5c and the light-receiving convex lens surface 5b and prevents irradiation light introduced from the light-emitting convex lens surface 5c from entering the region of the light-receiving convex lens surface 5b.

Thus, in this embodiment, with the light emitting element 1 situated at the front focal point position (f5c) of the light-emitting convex lens surface 5c, irradiation light from the light emitting element 1 is converted into parallel light by the light-emitting convex lens surface 5c, travels through the condensing lens 5, and is then condensed by the single convex lens surface 5a at the rear focal point position (f5a) of the single convex lens surface 5a.

Figure 9:
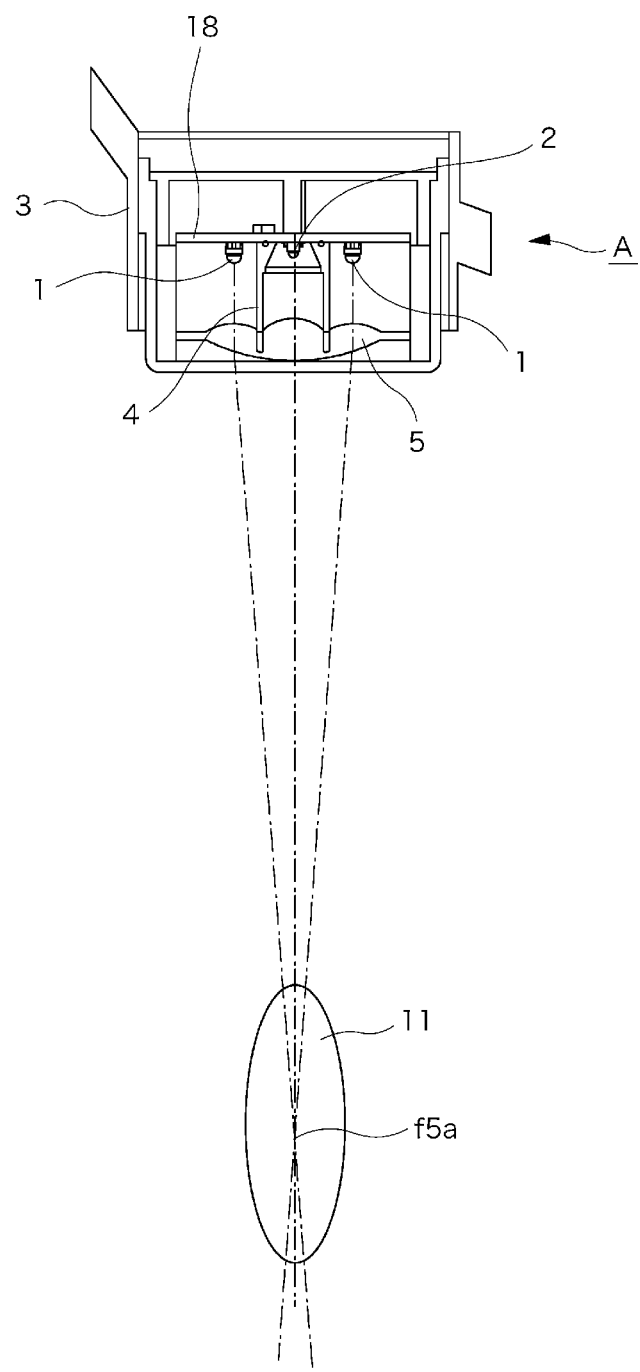
FIG. 9 is a view showing the detection region of the photosensor unit.

As a result, as shown in FIG. 9, by setting the detection region 11 near the rear focal point position (f5a) of the single convex lens surface 5a in a state where the photosensor unit (A) is fixed, the amount of detection light in the detection region 11 can be increased. In addition, light reflected from a detection object is condensed by the single convex lens surface 5a and the light-receiving convex lens surface 5b and efficiently delivered to the light receiving element 2. Accordingly, high detection accuracy can be achieved.

EXPLANATION OF REFERENCE NUMERALS

1 LIGHT EMITTING ELEMENT
2 LIGHT RECEIVING ELEMENT
3 UNIT CASE
4 PARTITION
5 CONDENSING LENS
6 LIGHT-EMITTING CONVEX LENS SURFACE
7 VEHICLE
8 DOOR CONTROLLING UNIT

The invention claimed is:

1. A photosensor unit including a light emitting element and a light receiving element housed in a unit case, and configured such that reflected light of detection light emitted from the light emitting element to an outside of the unit case is received with the light receiving element, the reflected light being reflected from the outside of the unit case, wherein
  a plurality of the light emitting elements are disposed around the light receiving element,
  a passage space for the reflected light inside the unit case is separated from a passage space for the detection light inside the unit case by an opaque partition,
  the unit case is provided with a condensing lens configured to condense irradiation light from all the light-emitting elements at a single focal point on an optical path of the reflected light, and
  the condensing lens includes a plurality of light-emitting convex lens portions integrally formed therewith respectively for the light emitting elements such that each of the light-emitting convex lens portions is located over a respective one of the light emitting elements.

2. The photosensor unit according to claim 1, wherein the light emitting elements are disposed at an equal interval on a single circle centered at the light receiving element.

3. A door controlling device of a vehicle, comprising:
  the photosensor unit according to claim 1 attached to the vehicle; and
  a door controller configured to start a preparatory operation for moving a door of the vehicle when a detection object is detected in a detection region based on a level of light reception at the light receiving element; wherein
  the detection region is located near the single focal point of the condensing lens.

* * * * *